Jan. 27, 1959    J. W. MANN ET AL    2,870,808
CONTINUOUSLY-OPERATED RADIO FREQUENCY ADHESIVE
SETTER FOR THE EDGE BONDING OF MATERIALS
Filed Dec. 14, 1951    11 Sheets-Sheet 1

INVENTORS
JULIUS W. MANN
GEORGE F. RUSSELL
BY
Munn & Liddy
ATTORNEYS

2,870,808
CONTINUOUSLY-OPERATED RADIO FREQUENCY ADHESIVE SETTER FOR THE EDGE BONDING OF MATERIALS

Julius W. Mann and George F. Russell, Tacoma, Wash.

Application December 14, 1951, Serial No. 261,692

11 Claims. (Cl. 144—281)

An object of our invention is to provide a continuously-operated radio frequency adhesive setter for the edge bonding of materials which is a continuation-in-part of our application on a radio frequency edge gluing press and process, Serial No. 208,627, filed January 30, 1951. In the pending case, we disclose a "Feed" and "Press" section for the edge gluing of pieces of material and mount the high frequency electrodes in the "Press" section. Both the "Feed" and "Press" sections make use of upper and lower endless conveyor belts which hold the material to be edge glued, in a flat plane while continually moving the material through the machine. A portion of the rear end of the "Feed" section overlaps a front portion of the "Press" section and the "Feed" section is power driven while the "Press" section is not power driven, but movement is imparted thereto by the pieces of material being forced by the "Feed" section into and through the "Press" section. The result is an abutting contact being made between the opposed edges of adjacent pieces which move from the "Feed" section and into the "Press" section and the pieces are held in abutting relation while they are subjected to high frequency radio lines of force while passing through the "Press" section.

In the present invention, we disclose a lay-up and speed-up endless belt conveyor means for the pieces of material which will deliver them to the "Feed" section of the machine. By means of this lay-up and speed-up means, the capacity of the machine is greatly increased over the machine shown in our copending case, and yet the edge bonding of the pieces is as efficiently carried out as in the copending case.

We have also found out that a better operating machine is provided where the lower halves of the "Feed" and "Press" sections have the upper reaches of their endless belts engaged by belt guides of an articulated type, the belt guides also exerting yielding and adjustable pressure against the belts for pressing them against the undersurfaces of the veneer pieces. By this we mean that the rear lower half of the endless belt conveyors in the "Feed" section are hingedly secured to the front lower half of the endless belt conveyors used in the "Press" section. Pneumatic means is provided at the place of hinging of the two sections together and pneumatic means is also provided at the forward end of the "Feed" section and at the rear end of the "Press" section for creating a regulatable and articulated pneumatic pressure means in the lower halves of both the "Feed" and the "Press" sections.

Again in our copending application, we show braking means for applying the desired retarding force on the press section to accommodate pieces of different sizes and thicknesses. In the present case the machine is primarily designed for the edge gluing of veneer pieces and the braking means is not needed.

In the present case we also provide a novel means for supporting the electrodes that are placed in the press section.

Other objects and advantages will appear in the following specification, and the novel features of the device will be particularly pointed out in the appended claims.

Our invention is illustrated in the accompanying drawings forming a part of this application, in which:

Figure 6 is an enlarged side elevational view of the feed end of the machine, parts being shown in section, this view including that portion included by the bracket VI in Figure 4;

Figure 8 is a vertical transverse sectional view taken along the plane VIII—VIII of Figure 6;

While we have shown only the preferred form of our invention, it should be understood that various changes or modifications may be made within the scope of the appended claims without departing from the spirit and scope of the invention.

In carrying out our invention, we think it best to first describe the general frame construction and the mounting of the various endless belt conveyors which are used in the "Lay-up" and "Speed-up" sections of the machine. We will then describe the "Drive" or "Feed" section of the machine and then the combined "Press" and "Electrode" section of the machine. The "Press" section is also known as the "Driven" section. The drive mechanism for the three sets of endless belt conveyors used in the "Speed-up," "Feed" and "Press" sections will then be mentioned. This will be followed by a description of the pressure means used in holding the pieces of veneer in a flat plane while they are being fed through the machine. The articulated pressure means for the lower halves of the "Drive" and "Driven" belt sections will be set forth with the novel and adjustable pressure means that is used in connection with these articulated sections. Finally, the high frequency electrode section and the particular mounting of the electrodes will be set forth and this will be followed by describing the operation of the entire machine.

*Frame construction and lay-up and speed-up sections of the machine*

Figure 4:
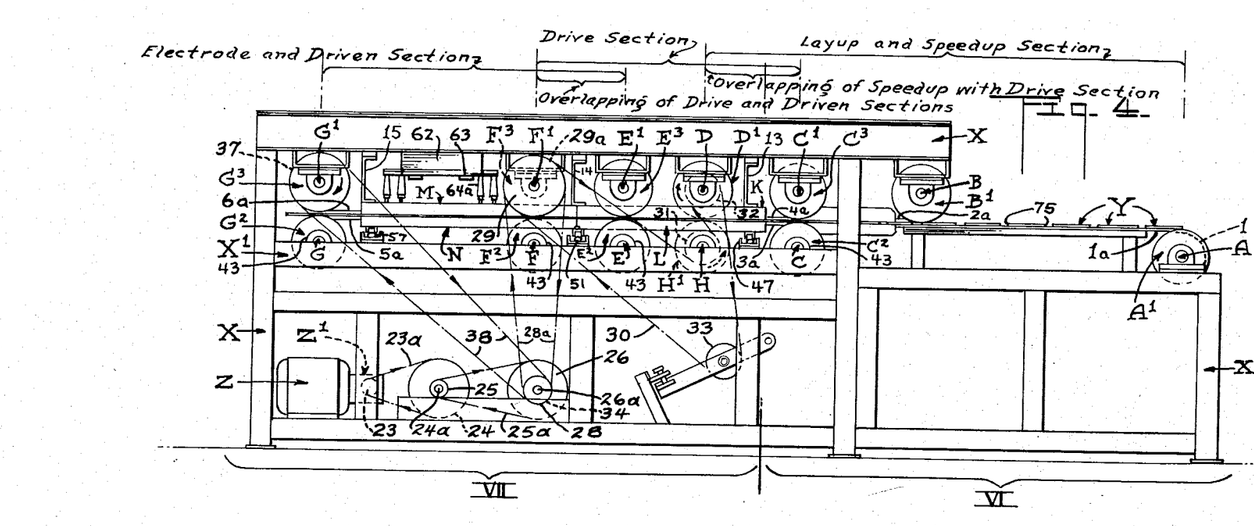
Figure 4 is a side elevation of the complete machine, looking at the left side thereof.

In Figure 4, we show a side elevation of the frame which is indicated generally at X. The front or feed end of the frame is shown to the right in this figure and we mount the "Lay-up" and "Speed-up" sections of the machine at this end. The "Lay-up" section comprises a shaft A, and a plan view of the shaft is shown on an enlarged scale in Figure 2. A plurality of sheaves A1 are mounted on the shaft in spaced relation. The sheaves A1 form the front end of the "Lay-up" belt section.

Figure 5:
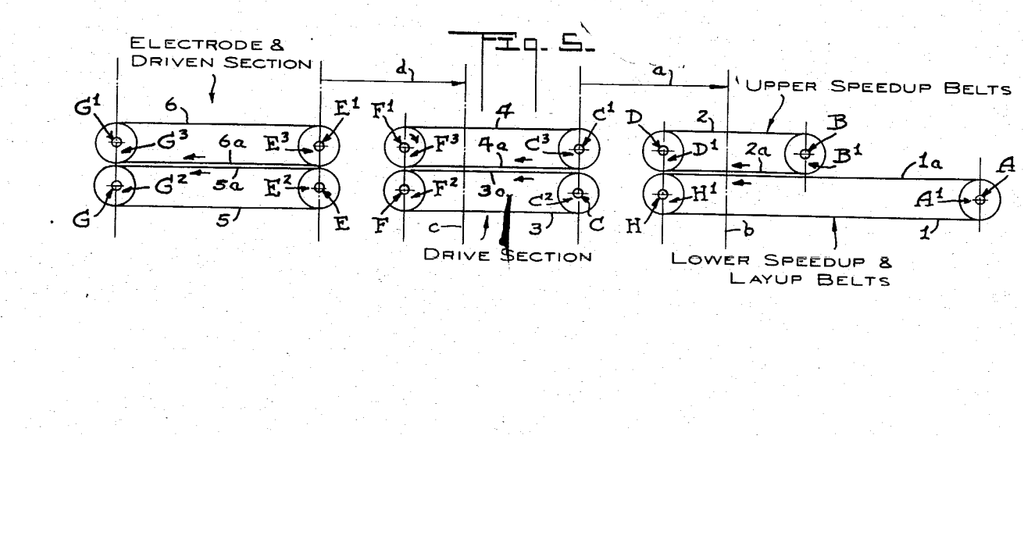
Figure 5 is an exploded schematic view of the endless belts employed in the machine.

In Figure 5, we indicate schematically a side view of all of the endless belt conveyors and have spaced these apart for clarity. The shaft A is illustrated to the right in Figure 5 and endless belts 1 are passed around the sheaves A1 and also passed around a plurality of sheaves H1, mounted on a shaft H. Referring to Figure 4, it will be seen that the pieces of veneer Y are placed on the upper reaches 1a of the endless belts 1 by hand, and will be carried to the left at a speed which is substantially twice the speed that the veneer pieces will move through the "Drive" and "Driven" sections of the machine.

Figure 2:
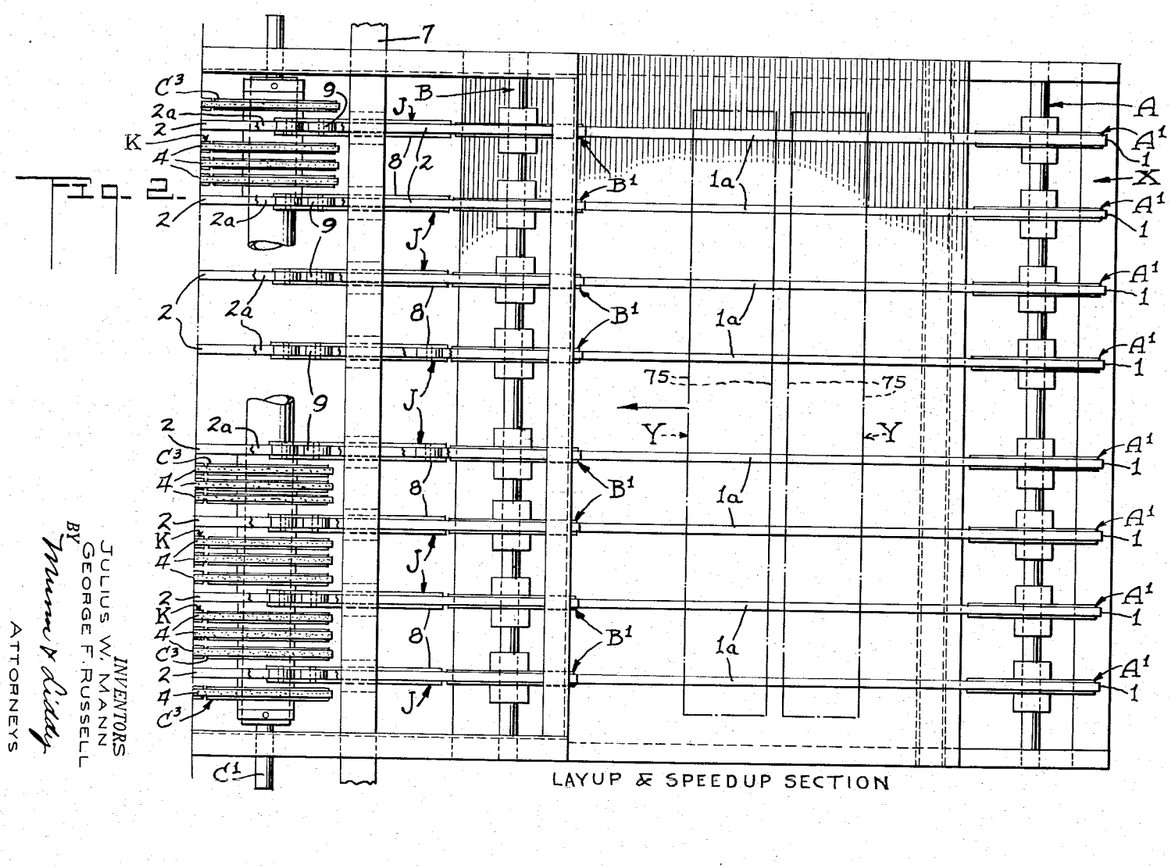
Figure 2 is an enlarged top plan view of the feed end of the machine, including the "Lay-up" and "Speed-up" sections, as indicated by the bracketed portion II in Figure 1.

In the schematic showing in Figure 5, we illustrate a forward shaft B for an upper "Speed-up" section and in Figure 4, we show that the forward shaft B is carried by the frame X. A plurality of sheaves B1 are mounted on the shaft B as will be seen from Figures 2, 4 and 5, and endless belts 2 are passed around the sheaves B1 and extend to sheaves D1 that are mounted on a shaft D. It will be noted from both Figures 4 and 5 that the longitudinal axes of the shafts H and D are disposed in the same vertical plane that extends transversely across the machine. Both Figures 2 and 4 illustrate the pieces of veneer Y moving to the left in these figures and being carried by the "Lay-up" belts 1 into a position where they will be contacted by the lower reaches 2a of the endless belts 2. The belts 2 are traveling at the same speed as the belts 1 and they will hold the pieces of veneer in a flat plane therebetween and will feed them to the endless belt assemblies of the "Drive" and "Driven" sections which will now be described.

*Drive or feed section*

It is best to refer to the schematic showing of Figure 5 where the upper and lower endless belt assemblies for the "Drive" or "Feed" section are illustrated. A shaft C is placed at the forward end of the lower endless belt drive section and Figure 4 illustrates how the shaft C is placed nearer the forward end of the frame X than is the rear shaft H which is used in the lower half of the "Speed-up" belt assembly. The arrow *a* in Figure 5 extends from a vertical plane that passes through the axis of the shaft C, and points to a dot dash line *b* which represents the vertical plane actually occupied by the lower shaft C of the "Drive" section. The shaft C1 of the upper "Drive" section will lie in the same vertical plane indicated by the dot dash line *b*. This means that the rear of the lower and upper "Speed-up" sections represented by the belts 1 and 2 will overlap the front ends of the lower and upper "Drive" section endless belts 3 and 4.

Again, in Figure 5 we illustrate schematically a rear drive shaft F in the lower half of the "Drive" section and a rear drive shaft F1 in the upper half of the "Drive" section. The endless belts 3 are passed around sheaves C2 and F2 that are mounted on the shafts C and F, respectively. These endless belts form the lower half of the drive section. The upper half of the drive section is made up of the endless belts 4 that are passed around sheaves C3 and F3 that are mounted on the shafts C1 and F1, respectively. In Figure 2 we show on a larger scale the sheaves C3 that are mounted on the forward upper shaft C1 and it will be seen that the endless belts 4 extending from the sheaves C3 are spaced between the endless belts 2 that form the upper "Speed-up" belt assembly. Inasmuch as the shafts C and C1 of the "Drive" section are placed ahead of the shafts H and D of the "Speed-up" section, there will be an overlapping of these two belt sections and the pieces of veneer Y will enter the "Drive" section before they will leave the "Speed-up" section.

We utilize this feature to move the pieces of veneer into an abutting edge to edge relation so that the pieces will be held in proper position while they are being moved through the "Drive" section and also through the "Driven" section. The electrodes in the "Driven" section will cause high frequency lines of force to pass through the adhesive planes and set the adhesive so as to bond the adjacent edges of the veneer pieces together. We will describe hereinafter how the "Speed-up" section belts 1 and 2 will move at approximately twice the speed as the "Drive" section belts 3 and 4. The pieces of veneer Y can be laid on the "Lay-up" portions of the belts 1 in spaced relation as shown in Figure 4, and the pieces will be brought into abutting relation with each other as they are fed into the "Drive" section, because the drive section is moving at substantially one-half the speed as the "Speed-up" section.

*Driven or press section*

Figure 3:
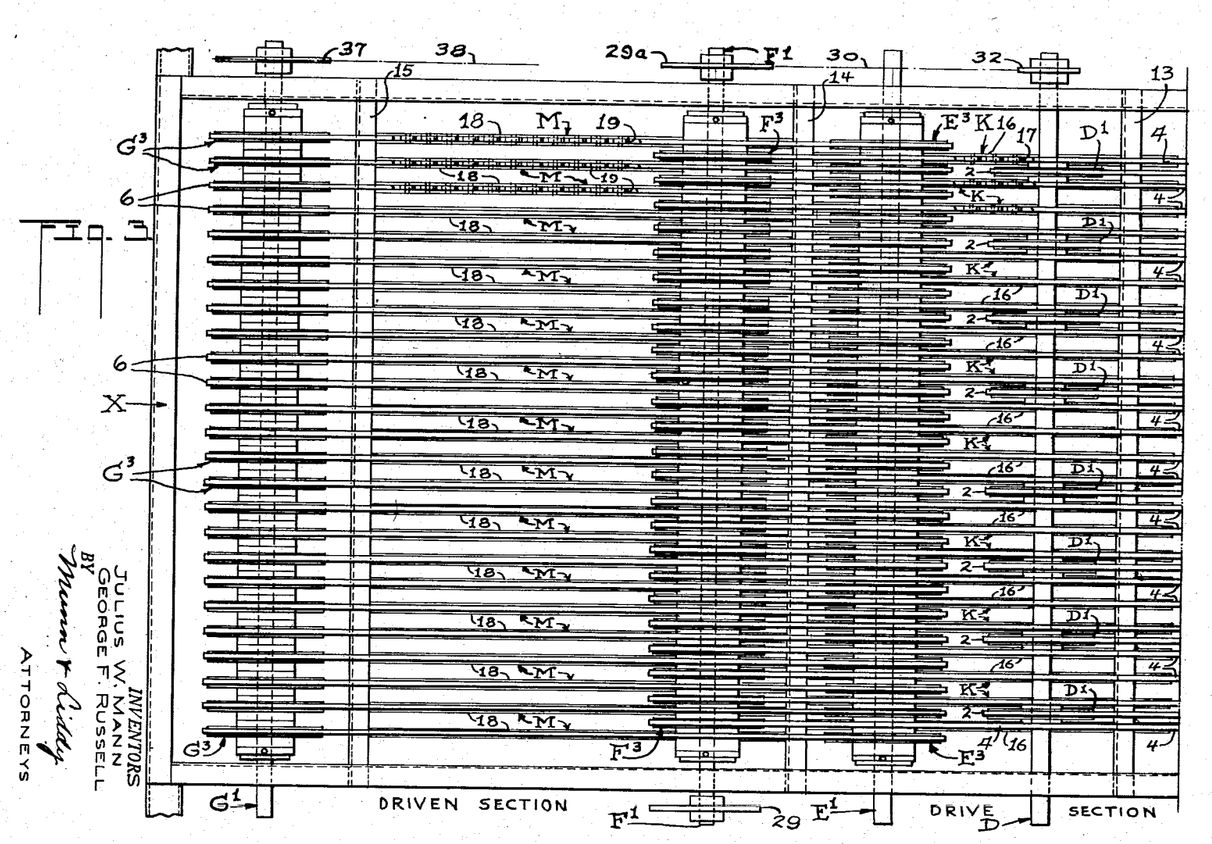
Figure 3 is a top plan view of the remainder of the machine, including the "Drive," "Driven" and "Electrode" sections, as indicated by the bracketed portion III in Figure 1.
Figure 7:
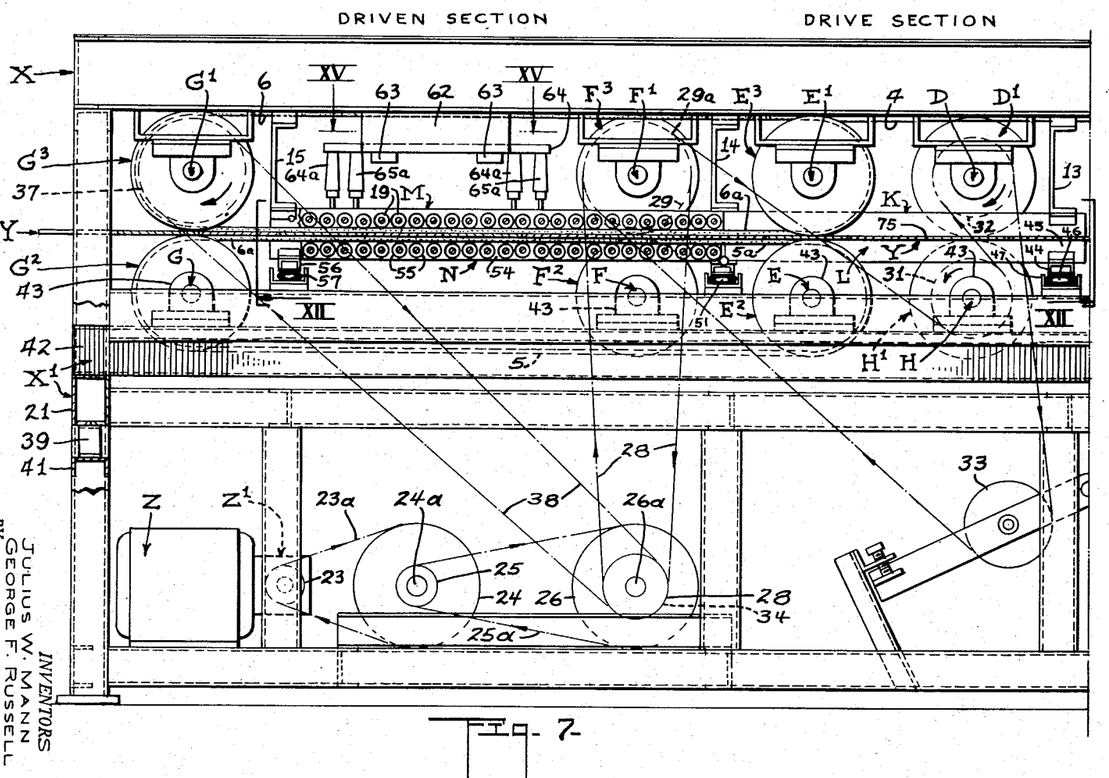
Figure 7 is an enlarged side elevational view, partly in section, of the remainder of the machine, as encompassed by the bracket VII of Figure 4.

The "Driven" or "Press" section is disclosed schematically in Figure 5 and in greater detail in Figures 3 and 7 as well as in Figure 4. Referring to Figure 5, it will be seen that the lower half of the "Driven" section is composed of a plurality of endless belts 5 that are passed around sheaves which in turn are mounted on shafts E and G. The shaft E carries a plurality of sheaves E2, while the shaft G carries a plurality of sheaves G2. The upper half of the "Driven" section is composed of endless belts 6 that are passed around sheaves which in turn are mounted on shafts E1 and G1. The shaft E1 carries sheaves E3, while the shaft G1 carries sheaves G3.

The shafts E and E1 are the forward shafts in the lower and upper halves of the "Driven" section and these are disposed in the same vertical plane. In the machine, the shafts E and E1 are placed ahead of the rear shafts F and F1 of the "Drive" section. In Figure 5, we indicate by the dot dash line *c* the vertical plane occupied by the axes of the shafts E and E1 in the machine. The arrow *d* in Figure 5 points to the actual vertical plane *c* which will be occupied by the axes of the shafts E and E1.

Figure 4 clearly shows the shafts E and E1 placed in front of the rear shafts F and F1 of the "Drive" section. Also in Figure 3 the various endless belts 6 disposed in the upper half of the "Driven" section are shown extending from the sheaves E3 mounted on the shaft E1, to the sheaves G3 mounted on the shaft G1. There is an overlapping portion between the rear ends of the "Drive" section and the front ends of the "Driven" section as indicated in Figure 4. Again, in Figure 3, the rear ends of the belts 4 in the upper "Drive" section are shown extending to the rear (left) of the shaft E1 of the "Driven" section and as being passed around the sheaves F3 which are mounted on the shaft F1.

*Drive mechanism*

In Figure 4 we show in a schematic way the means for driving the various endless belts disposed in the "Speed-up" and "Lay-up" sections and in the "Drive" and "Driven" sections. A motor is indicated at Z and as being operatively connected to a sprocket 23 by a gear reduction mechanism indicated generally at Z1. The sprocket 23 is connected to a large sprocket 24 by an endless chain 23a. Figure 7 discloses the same mechanism on a larger scale. The large sprocket 24 is mounted on a short countershaft 24a and the same shaft has a small sprocket 25 keyed thereto.

Again referring to Figures 4, 7 and 8, it will be seen that the small sprocket 25 is connected by an endless sprocket chain 25a to a large sprocket 26 mounted on a long counter-shaft 26a. The shaft 26a carries a sprocket 28 on the left hand side of the machine, see Figure 8, and this sprocket is operatively connected by a chain 28a to a sprocket 29 which is mounted on the shaft F1 provided in the rear end of the upper half of the "Drive" section. Therefore, as soon as the motor Z is started, the shaft F1 will be positively driven in a clockwise direction when looking at Figure 5. This will cause the lower reaches 4a of the belts 4 to move to the left in Figure 5.

In Figure 8, it will be seen that the right hand end of the drive shaft F1 has a second sprocket 29a keyed thereto so that this sprocket will be rotated when the shaft is rotated. An endless chain 30 is passed around the sprocket 29a and is also passed around smaller sprockets 31 and 32 in the manner shown in Figures 4 and 7. The small sprockets 31 and 32 are mounted on the shafts H and D, respectively, and are preferably one-half the size of the sprocket 29a. The sprocket chain 30 is passed around the small sprockets 31 and 32 so as to rotate the shaft H in a counter-clockwise direction and the shaft D in a clockwise direction and at a speed substantially twice the speed of the shaft F1. The chain 30 is then passed around an adjustable idler sprocket 33. The operation of the motor Z will impart rotative movement to the shafts F1, H and D and will not only cause the lower reaches 4a of the belts 4 in the upper half of the "Drive" section to move to the left in Figure 5, but will also cause the lower reaches 2a in the belts 2 of the "Speed-up" belts to also move to the left in Figure 5, but at a speed substantially twice that of the belts 4. Also the upper reaches 1a of the belts 1 in the "Lay-up" section will move to the left in Figure 5 at a speed substantially twice that of the belts 3. The upper reaches 1a of the endless belts 1 and the lower reaches 2a of the endless belts 2, will move at the same speed and therefore will feed the pieces of veneer Y that are laid on the upper reaches 1a into positions between the endless belts 1 and 2.

Normally the "Driven" section, composed of the lower and upper endless belts 5 and 6, will not be power driven, but instead the pieces of veneer Y which are fed from the "Drive" section into the "Driven" section will cause the upper reaches 5a of the endless belts 5 and the lower reaches 6a of the endless belts 6, to move to the left in Figure 5 and permit the veneer pieces Y to move therethrough while they are being held in edge to edge abutting relation. The "Driven" section carries the electrodes which will be explained hereinafter, and the radio frequency lines of force flowing from the electrodes will set the adhesive planes that are disposed between the abutting edges of the veneer pieces and will cause the pieces to adhere to one another and make a continuous sheet of veneer.

In case something should go wrong in the "Driven" section and it becomes necessary positively to drive this section in order to clear the pieces of veneer therefrom, we provide novel means for operatively connecting the "Driven" section with the motor Z. Of course the "Driven" section would be connected temporarily to the motor at the end of any run where there are no more pieces of veneer to be fed from the "Drive" section into the "Driven" section and it becomes necessary to remove the pieces of veneer that are in the driven section so as to clear the machine.

In Figure 8 we show the long counter-shaft 26a as being provided with a sprocket 34 and this sprocket is free to rotate on the counter-shaft. A clutch indicated generally at 35 is manually controlled through an actuating rod 36, and when the operator wishes to positively drive the "Driven" section, he moves the clutch 35 into engagement with the sprocket 34. The clutch is keyed to the counter-shaft 26a and therefore a rotation of the shaft will rotate the sprocket 34 therewith. In both Figures 4 and 7, we show a sprocket 37 keyed to the shaft G1 and an endless chain 38 connects this sprocket with the sprocket 34. The shaft G1 will be rotated in a clockwise direction when looking at Figure 7, when the clutch 35 connects the sprocket 34 to the shaft 26a. A positive rotation of the shaft G1 in a clockwise direction will cause the lower reaches 6a of the endless belts 6 to remove the pieces of veneer Y from the "Driven" section. In this simple way the "Driven" section may be power driven at any time the operator so desires.

*Pressure means for holding the pieces of veneer in a flat plane while they are being continuously moved*

It is necessary that the pieces of veneer be held in a flat plane while they are moving through the machine and it is also necessary to exert a pressure against both surfaces of the veneer during this movement so that the abutting edges of the veneer will be held in perfect registration with each other throughout their lengths. This pressure must not be too great to prevent ready movement of the veneer pieces through the machine and therefore we maintain the pressure means adjustable as well as yielding so as to accommodate pieces of different types and sizes as well as thicknesses. Throughout the machine from the feed end to the exit end, we provide an unyielding upper flat plane composed of the lower reaches of the endless belts that are positioned above the pieces of veneer. The lower reaches of the upper endless belt assemblies are continually moving with the veneer pieces thus permitting them to be moved continuously through the machine.

It will be readily apparent that the lower reaches of the endless belts of the upper halves in and by themselves are not strong enough to provide the upper perfectly flat plane against which the upper surfaces of the pieces of veneer can be pressed while they are moving through the machine. We therefore provide a plurality of bearing wheels against which the lower reaches of the upper belts press when veneer is passing through the machine, and these wheels are rigidly held in a predetermined plane so as to cause the lower reaches of the belts to present an unyielding flat surface to the veneer pieces while still permitting free movement of the belts and pieces.

Figure 9:
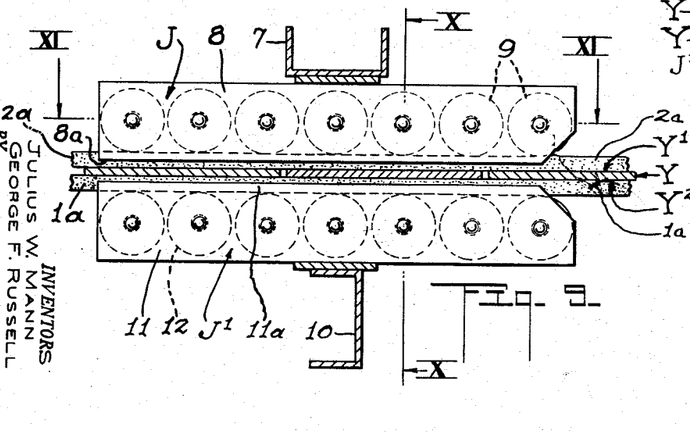
Figure 9 is an enlarged longitudinal sectional view illustrating the coacting rollers utilized in the "Speed-up" section, and included by the square brackets IX—IX in Figure 6.
Figure 10:
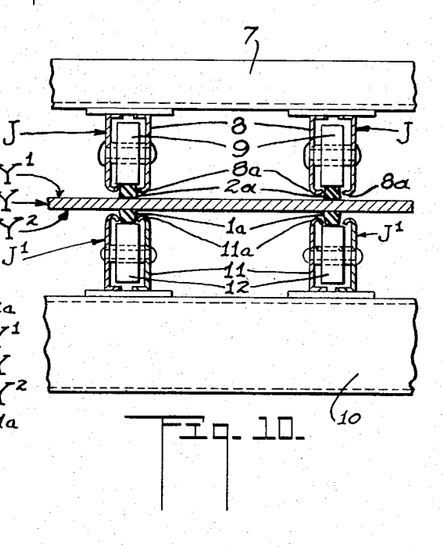
Figure 10 is a vertical transverse sectional view taken along the plane X—X in Figure 9.
Figure 11:
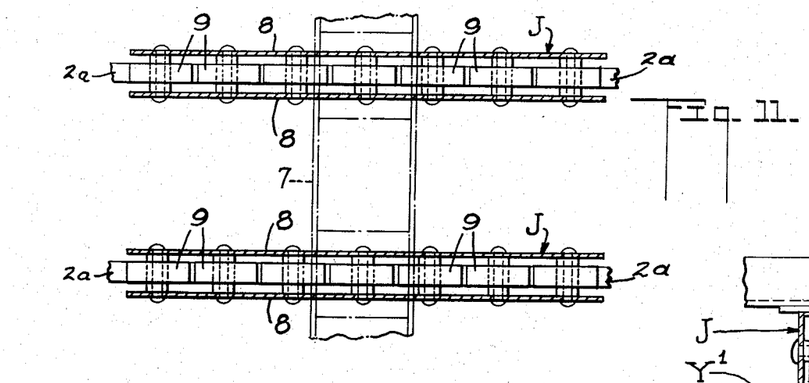
Figure 11 is a horizontal sectional view taken along the plane XI—XI of Figure 9.

In Figure 6, we show an upper wheel assembly at J which is positioned above the lower reach 2a of one of the endless belts 2. In Figure 2, we show a plurality of the upper wheel assemblies J, one being provided for each lower reach 2a. A clear detail showing of one of the wheel assemblies J is indicated in Figures 9, 10 and 11. It will be seen that the frame X in Figure 6 supports a transversely extending channel 7 and this channel in turn supports the wheel assemblies J which consist of longitudinally extending frames 8 in which wheels 9 are rotatably mounted, see Figure 10. We have found that skate wheels are ideally suited for this purpose. Both Figures 9 and 11 show the skate wheels 9 placed as close together as possible in order to provide a continuous bearing support for the lower reaches 2a of the endless belts 2. Figure 10 shows how the lower edges 8a of the frames 8 are curved so as to provide guideways for the sides of the lower reaches 2a. Figure 10 further illustrates the veneer piece Y having its upper surface Y1 bearing against the lower reaches 2a of the belts. Figure 9 illustrates clearly how the lower reaches 2a extend throughout the lengths of the frames 8 and are guided by the rounded edges 8a.

Again referring to Figure 6, it will be seen that the frame X carries a cross channel 10, and Figure 9 shows this cross channel as supporting groups of wheel assemblies indicated generally at J1. The wheel assemblies J1 are all of an identical construction to the wheel assemblies J. The frames 11 of the groups J1 carry wheels 12 and these wheels support the upper reaches 1a of the endless belts 1 which are used in the "Lay-up" section of the machine. The frames 11 have rounded upper edges 11a, see Figure 10, for guiding the upper reaches 1a of the endless belts 1. The wheel assemblies J1 are preferably mounted directly below the wheel assemblies J. The upper reaches 1a of the endless belts 1 will contact with the under surfaces Y2 of the pieces of veneer Y. The purpose of the upper and lower sets of wheel assemblies J and J1 placed in the lower and upper "Speed-up" halves of the machine is to cause the veneer contacting portions of the belts to flatten the pieces of veneer Y into a common flat plane just before these pieces are fed into the "Drive" section of the machine. There is a yielding support for both the upper and lower wheel assemblies J and J1 and this will result in bringing all the pieces of veneer into the same flat plane so that the edges of adjacent pieces will lie in the same plane throughout their entire lengths. It is this feature that permits very thin pieces of veneer to be edge bonded and form a continuous sheet of veneer.

Figure 12:
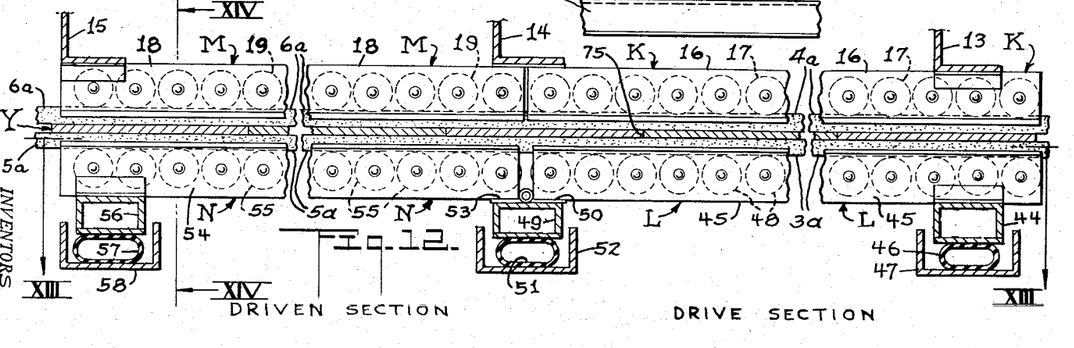
Figure 12 is an enlarged vertical longitudinal sectional view of the coacting rollers and associated parts, which are employed in the "Drive" and "Driven" press sections, this view being designated more particularly by the square brackets XII—XII of Figure 7.

In Figures 7 and 12 to 14, inclusive, we illustrate the upper wheel assemblies in the "Drive" and "Driven" sections for acting as a bearing surface against which the lower reaches 4a and 6a of the endless belts 4 and 6 can press. In Figure 7, we show the frame X supporting a plurality of transversely extending and spaced-apart channel irons 13, 14 and 15, respectively. In Figure 12 the same three channel irons 13, 14 and 15 are shown on a larger scale and as supporting a plurality of upper skate wheel assemblies K and M. The skate wheel assembly K comprises a frame 16 secured to the transversely extending channels 13 and 14, and the frame rotatably carries a plurality of wheels 17 which are preferably of the skate wheel type. The lower reaches 4a of the endless belts 4 bear against the wheels 17 in each assembly K and therefore the wheels will provide a firm bearing surface while permitting the lower reaches 4a to move continuously to the left in Figure 12 as they travel along with the veneer pieces Y.

The wheel assemblies K have a length which will cause them to extend substantially the entire distance between the sheaves C3 and F3 of the "Drive" section, see Figures 2 and 3, and therefore the lower reaches 4a of the endless belts 4 will have sufficient bearing support and the pieces of veneer Y can be pressed against the lower reaches 4a by a yielding means hereinafter described. We have found that this arrangement will maintain a flat plane against which the pieces of veneer can be pressed while they move through the "Drive" section of the machine.

Figure 1:
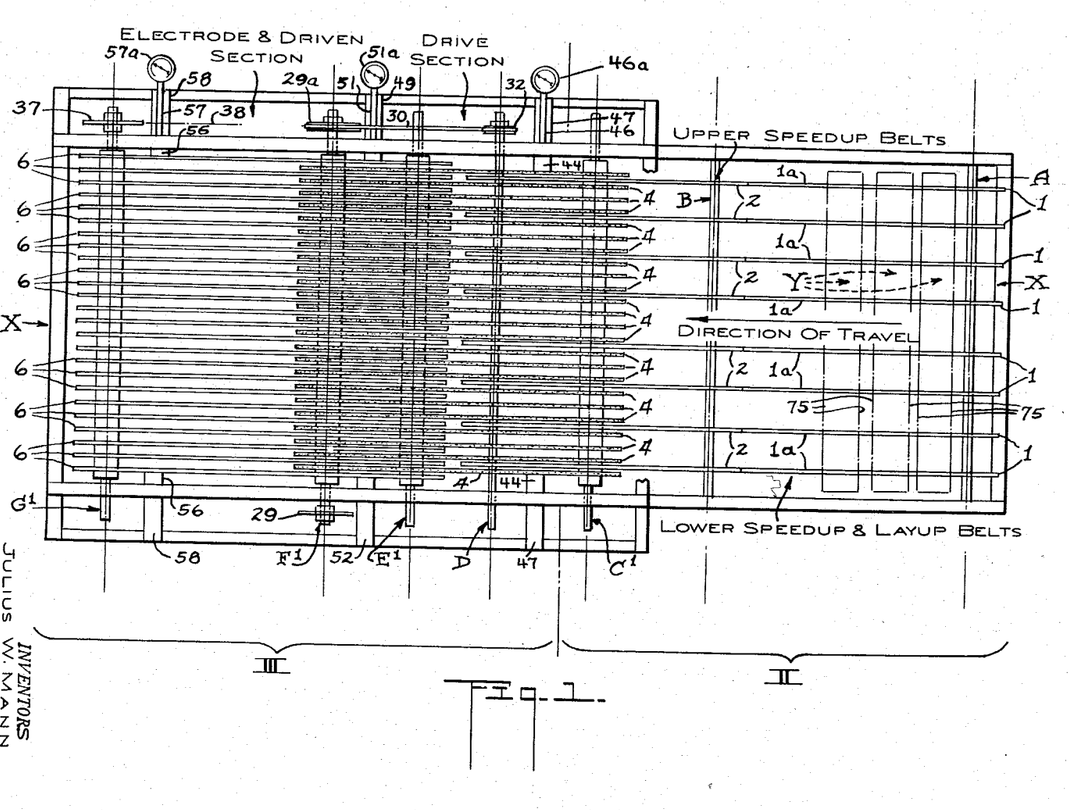
Figure 1 is a top plan view of the entire continuously-operated radio frequency adhesive-setter for edge bonding of materials.

Between the transversely extending channels 14 and 15, shown in Figure 12, we mount another set of upper wheel assemblies M for the "Driven" section. The frames 18 of these assemblies are identical to the frames 16 of the assemblies K, and the wheels 19 mounted in the frames 18 are identical to the wheels 17 in the frames 16. In Figure 1 we illustrate the endless belts 6 in the "Driven" section as being spaced to one side of the endless belts 4 in the "Drive" section so that the rear portion of the "Drive" section can overlap the front portion of the "Driven" section for a certain distance. The skate wheel frames M which contact with the lower reaches 6a of the endless belts 6 must therefore be spaced transversely to one side of the frames 16 in the wheel assemblies K where the wheels 17 contact with the lower reaches 4a of the endless belts 4. It is this staggering or transverse arrangement of the wheel assemblies K and M which provides an upper flat bearing support of wheels 17 and 19 against which the lower reaches 4a and 6a of the belts can bear.

Figure 13:
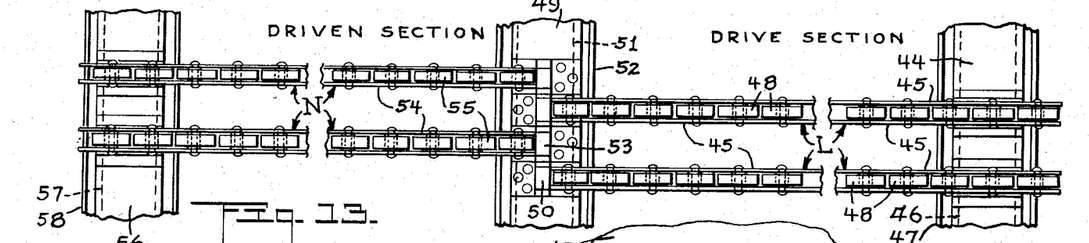
Figure 13 is a fragmentary plan view taken substantially along the horizontal plane XIII—XIII of Figure 12 below the lower V-belt and above the rollers.
Figure 14:
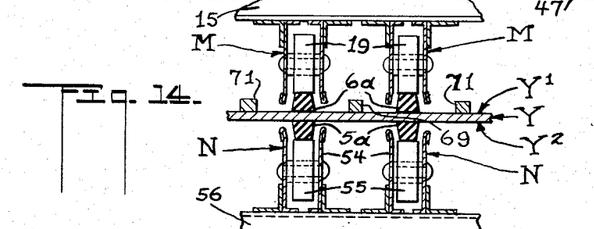
Figure 14 is an enlarged vertical transverse sectional view taken along the plane XIV—XIV of Figure 12.

The wheel assemblies M have their frames made substantially long enough to extend between the sheaves E3 and G3, see Figure 5. Inasmuch as the sheaves E3 are placed in front of the sheaves F3 of the "Drive" section, the transverse channel 14 extends between these two groups of sheaves E3 and F3. The rear ends of the wheel assembly frames 16 terminate at a point under the transverse channel 14 while the front ends of the wheel assembly frames 18 terminate under the same channel. A rigid superstructure is provided for the upper belt assemblies in the "Drive" and "Driven" sections by this arrangement of parts. We have found it advisable to urge the upper reaches 3a and 5a of the endless belts 3 and 5, see Figure 5, in an upward direction so that these upper reaches will yieldingly contact the pieces of veneer Y against their under surfaces and hold them against the flat horizontal plane formed by the wheel assemblies K and M. We have further found that the best arrangement for yieldingly supporting the upper belt reaches 3a and 5a is accomplished by an articulated wheel assembly which is shown in Figures 12 to 14, inclusive. Before describing this assembly it is best to show how the lower belt assemblies 3 and 5 are carried by a floating frame.

Referring to Figures 6 and 7, it will be seen that we provide a floating frame XI. The forward end of this frame is composed of a transversely extending box beam 20, while the rear end of the frame comprises a second box beam 21. The forward box beam 20 is indicated in Figure 8 as being yieldingly supported by leaf-springs 22, while Figure 7 shows the rear transversely extending box beam 21 yieldingly supported by leaf-springs 39. The leaf-springs 22 rest upon the transversely extending channel iron 40, while the leaf-springs 39 rest upon the transversely extending channel iron 41, see Figure 7. Both the channel irons 40 and 41 have their ends rigidly connected to the frame 4.

Again referring to Figure 8, it will be seen that the floating frame XI has its forward box beam 20 connected to the rear box beam 21 by longitudinally extending channels 42, see also Figure 7. The longitudinally extending channels 42 support the bearings 43 which in turn rotatably carry the transverse shafts C, H, E, F and G, see Figures 4 and 7. We have already set forth how the shafts C, F, E and G through their sheaves, carry the lower endless belts 3 and 5 of the "Drive" and "Driven" sections. Both the "Drive" and "Driven" sections have their lower endless belts 3 and 5 yieldingly supported by the floating frame XI.

It is necessary that the upper reaches 3a and 5a of the endless belts 3 and 5 be supported and exert a predetermined pressure against the under surfaces Y2 of the pieces of veneer Y. In Figures 7 and 12 we show an articulated wheel assembly support for the upper reaches 3a and 5a of the endless belts 3 and 5 and the articulated support comprises the wheel assemblies L for the "Drive" section and the wheel assemblies N for the "Driven" section. A box-like member 44 is placed at the front ends of the lower wheel assemblies L and this member supports the front ends of the wheel assembly frames 45, see Figure 13. The member 44 rests upon an inflatable hose section 46 which in turn is received in a transversely extending channel 47. In Figure 8, we show the channel 47 as having its ends connected to the sides of the frame X and therefore the channel 47 will be held in the fixed position. We will describe hereinafter how the air to the hose section 46 may be regulated for altering the pressure exerted by the hose against the member 44.

The frames 45 of the wheel assemblies L, carry wheels 48 and these wheels are urged against the upper reaches 3a of the endless belts 3. The length of the frames 45 is substantially equal to the distance between the sheaves C2 and F2 that carry the endless belts 3.

A central transversely extending box-like member 49, see Figure 12, has the rear ends of the frames 45 hingedly secured thereto at 50 in order to provide the front half of the articulated wheel assembly support for the upper belt reaches 3a. A second hose section 51 is placed under the member 49 and is received in a transversely extending channel 52 that is identical to the channel 47 and has its ends rigidly secured to the sides of the frame X. A plurality of wheel assembly frames N for the upper reaches 5a of the endless belts 5 have their forward ends hingedly secured to the central member 49 at 53, see Figures 12 and 13. The frames 54 of the wheel assemblies N, carry wheels 55 that bear against the upper reaches 5a and as already stated the forward ends of the frames 54 are hinged to the member 49 at 53 and the rear ends of the same frames are supported by a box-like member 56. This member rests on a third hose section 57 which is mounted in the transversely extending channel 58 and this channel like the channels 47 and 51 has its ends rigidly secured to the sides of the frame X.

In Figure 8, we show the first hose section 46 in communication with a tank 59 by a conduit 60 and a valve 61 in the conduit controls the amount of compressed air admitted into the hose section 46 from the tank. In Figure 1 we illustrate diagrammatically how each of the hose sections 46, 51 and 57 has its own air pressure gauge 46a, 51a and 57a, respectively, so that the desired air pressure may be delivered independently to each of the air hose sections from the compressed air source. In this way the articulated wheel assemblies L and N will exert the required force against the upper reaches 3a and 5a of the endless belts.

Again referring to Figures 12 to 14, inclusive, it will be seen that the frames 45 of the wheel assemblies L are staggered with respect to the frames 54 of the wheel assemblies N because the belts 3 are staggered with respect to the belts 5. The belts 3 are disposed directly under the belts 4, while the belts 5 are disposed directly under the belts 6. Figure 14 indicates how the lower reaches 6a of the belts 6 will contact with the upper surfaces Y1 of the pieces of veneer Y, while the upper reaches 5a of the belts 5 will contact with the under surfaces Y2 on the same veneer pieces. A continuous and articulated support for the lower halves of the "Drive" and "Driven" sections are provided in this way.

*High frequency electrode section*

The purpose of the "Driven" section composed of the endless belts 5 and 6 is to feed the pieces of veneer which are held in abutting relation, past a plurality of electrodes so that high frequency radio waves will pass from the electrodes and through the adhesive planes in lines paralleling these adhesive planes for setting the adhesive. Figures 15 to 19, inclusive, show the electrode supporting means on a large scale, while Figure 4 indicates how the supporting means is secured to the frame X. Referring to Figure 4, it will be seen that insulating blocks 62 are secured to the longitudinally extending top channel members of the frame X, see also Figure 16. The longitudinally extending insulating blocks 62 in turn support transversely extending insulating members 63. These members preferably extend from side to side of the machine and support longitudinally extending insulating bars 64 and 65. There are preferably three bars 64 and three bars 65 and these are arranged in pairs as clearly shown in Figure 16, although we do not wish to be confined to this exact structure.

Figure 15:
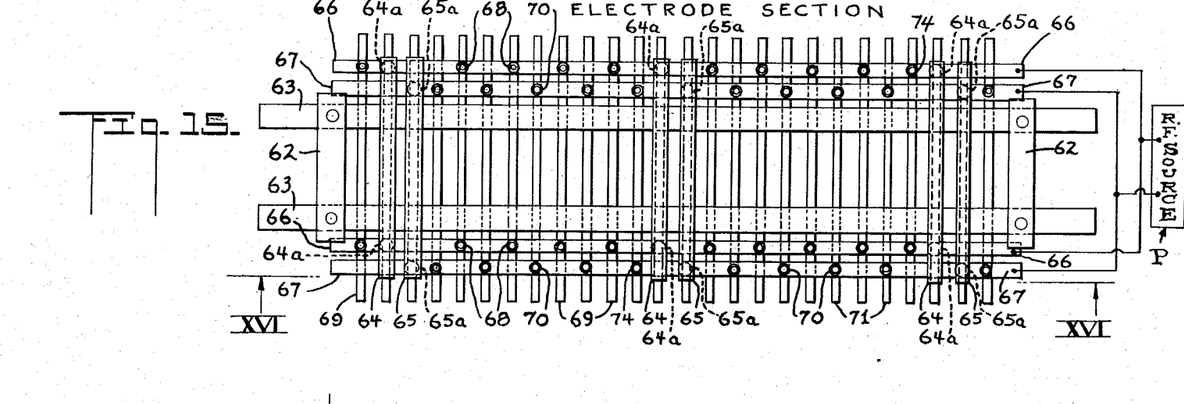
Figure 15 is a top plan view of the electrode section as seen from the horizontal plane XV—XV of Figure 7.
Figure 16:
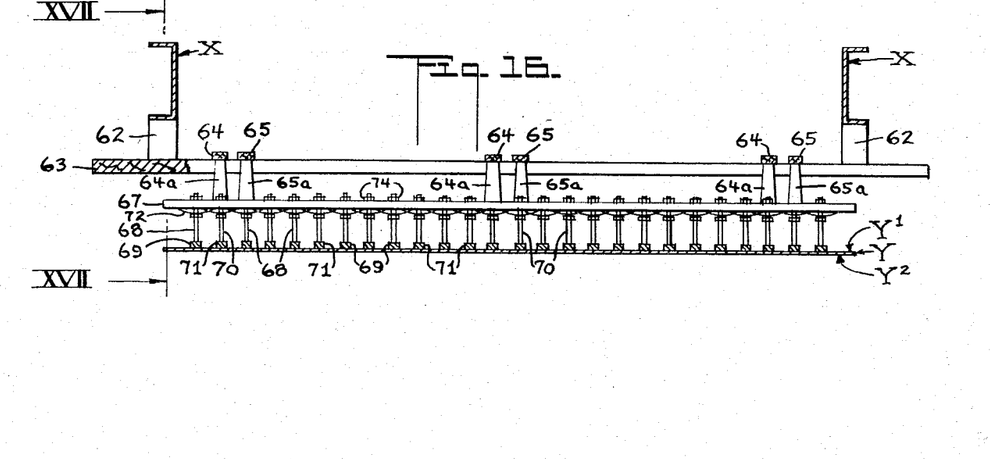
Figure 16 is a vertical transverse sectional view taken along the plane XVI—XVI of Figure 15.

The insulating bars 64 and 65 carry pairs of transversely extending bus bars and support these bus bars by depending insulators. Referring to Figures 15 and 16, it will be seen that the members 64 carry depending insulators 64a, while the members 65 carry depending insulators 65a. The lower ends of the insulators 64a support a pair of bus bars 66 that are spaced from each other as clearly shown in Figure 15. In like manner the depending insulators 65a support another pair of bus bars 67. It will be seen that the bus bars are arranged in two pairs, each pair comprising the bus bars 66 and 67.

Figures 17, 18, 19:
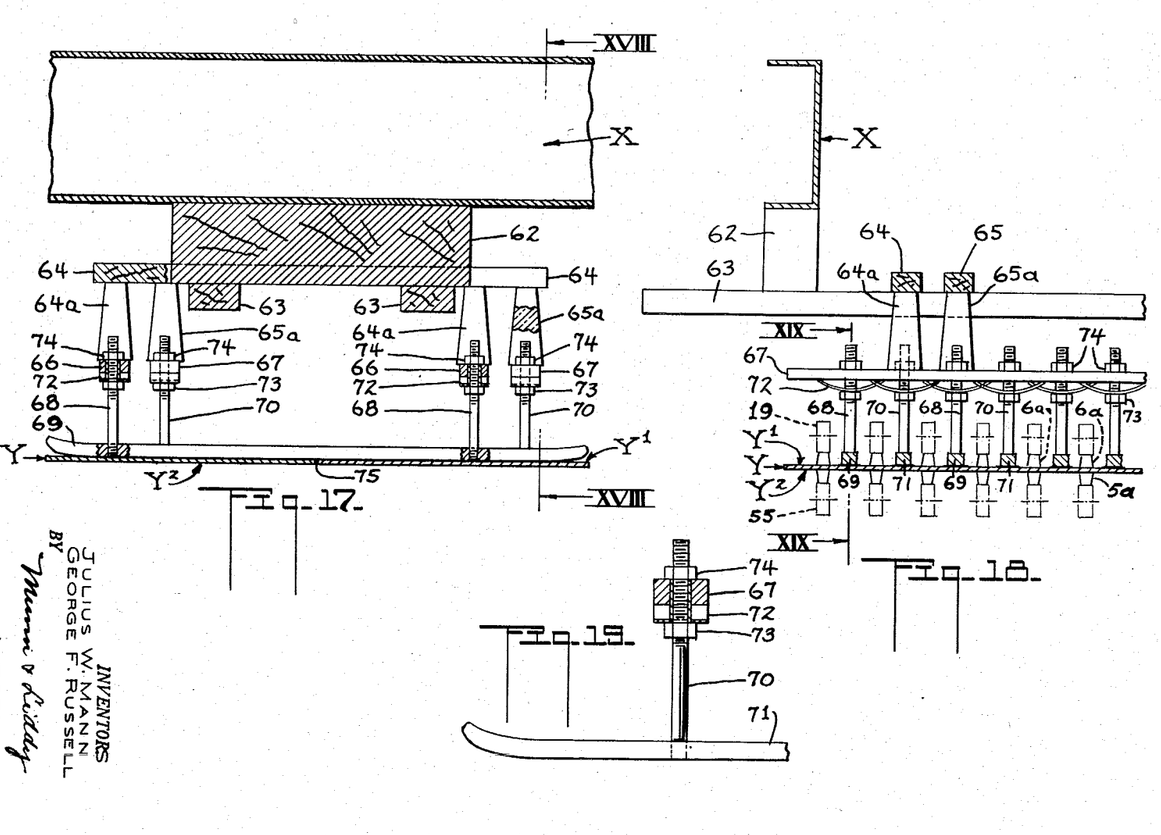
Figure 17 is an enlarged longitudinal sectional view relative to the machine, this view being taken along the vertical plane XVII—XVII of Figure 16.
Figure 18 is a fragmentary transverse sectional view taken along the plane XVIII—XVIII of Figure 17.
Figure 19 is a longitudinal enlarged view of a portion of one of the electrodes and mounting therefor, as observed from the vertical plane XIX—XIX of Figure 18.

In Figure 17, we show the depending insulators 64a on a larger scale and as supporting the pair of bus bars 66. We further show in the same figure, a pair of threaded rods 68 that are adjustably secured to the bus bars 66 and have their lower ends supporting an electrode 69 of the shape shown in Figure 17. This electrode 69 will receive the same charge of electricity which is delivered to the bus bars 66 at any given instant of time during the operation of the machine.

Again referring to Figures 17 and 18, it will be noted that the depending insulators 65a supported by the longitudinally extending member 65 will in turn carry the pair of bus bars 67. We provide threaded rods 70 that are adjustably connected to the bus bars 67 at their upper ends and have their lower ends connected to a second electrode 71 of the same shape as the electrode 69 and paralleling the electrode 69.

In Figure 18 we illustrate a plurality of the electrodes 69 and 71 and show how these are spaced midway between the lower reaches 6a of the endless belts 6 provided in the upper half of the drive section. The lower belt reaches 6a are indicated by dot dash lines in Figure 18 and we also indicate the wheels 19 engaging with these lower reaches. The result is that the pieces of veneer Y are moved along the electrodes 69 and 71 and will contact the electrodes. The electrodes 71 are placed between the electrodes 69 and therefore when the electrodes 69 are positively charged the electrodes 71 will be negatively charged and vice versa.

We prefer to use the radio circuits illustrated in our Patents No. 2,506,158 and No. 2,453,241, to be used with this machine. In Figure 15 we indicate the high frequency radio generator diagramamtically at P. This generator is connected to the bus bars 66 and 67 in the manner shown so that the electrodes 69 and 71 will be positively and negatively charged at the same time. The radio frequency lines of force will pass between adjacent electrodes 69 and 71 in a direction which parallels the glue planes that are arranged between adjacent veneer pieces and therefore parallel bonding of the glue planes will take place.

In Figure 18, we show how the threaded rods 68 and 70 may be yieldingly carried by the bus bars 66 and 67. Leaf-springs 72 are placed on the under side of the bus bars and have their ends yieldingly contacting the bars while their centers yieldingly contact nuts 73 that are adjustably mounted on the bars 68 and 70. If there are any irregularities in the pieces of veneer Y as they move through the machine, the electrodes 69 and 71 will be able to lift slightly, the leaf-springs 72 flattening during this movement to the desired extent. After the obstruction which has lifted the electrodes has passed, the leaf-springs 72 will return the electrodes to normal position. The normal position of the electrodes is determined by the nuts 74 which contact with the tops of the bars 66 and 67.

*Operation*

The machine is started in its operation by closing a switch not shown which connects the motor Z with a source of current, see Figure 4. The reduction gearing 21 is adjusted by a means, not shown, for causing the machine to operate at the desired speed. The high frequency radio generator P shown diagramamtically in Figure 15, is turned on and therefore a high frequency alternating current will flow to the electrodes 69 and 71. As already stated, the electrodes 71 are placed between the electrodes 69 alternately throughout the entire width of the machine. At any given instant all of the electrodes 69 are positively charged, while at the same time the other electrodes 71 are negatively charged and vice versa. This will cause radio frequency lines of force to flow between adjacent electrodes 69 and 71 in paths at right angles to the lengths of the electrodes and therefore the paths of the radio frequency lines of force will parallel the glue planes which are interposed between adjacent pieces of veneer Y. Split pole parallel bonding can be used if desired as disclosed in our Patent No. 2,678,897, issued May 18, 1954. The clutch 35, shown in Figure 8, is disconnected in order that the driven section comprising the endless belts 5 and 6 will not be connected to the motor Z.

The pieces of veneer Y that are to be edge bonded have their edges applied with a layer of adhesive that will set when subjected to the heating effect of the radio frequency lines of force as they pass between the electrodes 69 and 71. The operator then places the pieces of veneer on the "Lay-up" belt 1 which is at the right hand end of the machine shown in Figure 4. The pieces of veneer need not be placed in abutting relation as they are laid upon the "Lay-up" belts 1. In fact, Figure 4 illustrates a spacing between adjacent pieces of veneer. The pieces Y will move toward the left in Figure 4 and be guided between the lower reaches 2a of the upper "Speed-up" belts 2 and the upper reaches 1a of the lower "Lay-up" or "Speed-up" belts 1. The two sets of belts 1 and 2 preferably move at a speed which is approximately twice the travel of the endless belts 3 and 4 in the "Drive" section of the machine. Figure 2 illustrates how the pieces Y extend across the width of the machine and are transported by the upper reaches 1a of the belts 1 to the left in this figure. The longitudinal edges 75 of the pieces Y have the layer of adhesive applied thereto.

Figure 6 illustrates the front end of the machine on a larger scale and shows how the pieces Y are spaced from each other as they are moved along by the upper reaches 1a of the endless belts 1. The same spacings between the adjacent pieces Y is maintained as the pieces enter between the belts 1 and 2. The upper and lower sets of wheels indicated generally at J and J1 bear on the lower reaches 2a of the belts 2 and the upper reaches 1a of the belts 1 for flattening the pieces of veneer Y and holding them in a common plane. This will bring the opposed edges 75 of the adjacent pieces of veneer into the same plane so that the subsequent bringing of the opposed edges into abutting relation will cause the entire lengths of the adjacent pieces to be brought into parallel and abutting relation with respect to each other. The "Lay-up" and "Speed-up" sections are for the purpose of feeding the veneer pieces Y into the machine faster than the operator can place them on the "Lay-up" section. Also the operator need not lay the pieces Y in abutting relation.

The pieces are moved from the "Speed-up" section of the machine into the "Drive" section which is shown on a larger scale in Figure 7. Inasmuch as the pieces Y are moved into the "Drive" section at a speed substantially twice that maintained by the belts 3 and 4 in this section, the opposed edges of the adjacent pieces will be brought into abutting relation for the purpose of bonding the edges as the pieces pass through the "Driven" or "Press" section of the machine. It should be noted at this point that power is applied to the rear shaft F1 of the upper endless conveyor belts 4 in the "Drive" section and therefore the lower reaches 4a of these belts will be placed under tension as the belts frictionally contact with the pieces Y and are pulled taut by the rotation of the shaft F1 and the sheaves F3. We have found that this pulling tension on the lower reaches 4a of the endless belts 4 in the "Drive" section, will create a constant pressure force between adjacent pieces Y and cause a firm contact to be made and maintained as the pieces move from the "Drive" section into the "Driven" section.

It should also be noted at this point that the belts 5 and 6 in the "Driven" section are moved by the pieces Y because they are frictionally engaged by the upper reaches 5a of the endless belts 5 and the lower reaches 6a of the endless belts 6. Therefore, a compression will be created on the lower reaches 6a of the belts 6 between their actual contact with the upper surfaces Y1 of the pieces Y and the places where the lower reaches 6a feed onto the rearward sheaves G3. Also a compression of the portions of the upper belt reaches 5a lying between the pieces Y and the pulleys G2 will take place because these portions will tend to rotate the idler pulleys G2. The compression thus applied on the portions of the lower reaches 6a and on similar portions of the upper reaches 5a of the endless belts 5 and 6 will cooperate with the tension on the reaches 3a and 4a to maintain the proper pressure contact between the adjacent pieces as they are moved from the "Drive" to the "Driven" sections and through the "Driven" section and therefore a perfect bonding of the pieces is effected because the radio frequency lines of force are sent through the adhesive planes while the adjacent pieces Y are held in abutting relation under the proper pressure.

We have also set forth how the upper endless belts 4 and 6 in the drive and driven sections have their lower reaches 4a and 6a held in a perfectly flat plane by the sets of wheels indicated generally at K and M. This structure is vital in maintaining a perfectly flat plane for the pieces of veneer as they pass through the drive and driven sections, while permitting the pieces to be readily moved through these two sections in order to make the machine continuous in operation. Sets of wheels 17 extend substantially throughout the entire length of the lower reaches 4a of the belts 4, while the sets of wheels 19 extend substantially throughout the entire lengths of the lower reaches 6a in the endless belts 6.

A further vital feature of our invention is the construction of an articulated pressure means comprising the sets of wheels 48 and 55 which are urged upwardly at a desired pressure and move the upper reaches 3a and 5a of the endless belts 3 and 5 in the drive and driven sections against the under surfaces Y2 of the pieces Y. The wheels in the members L will contact with substantially the entire length of the upper reach 3a, while the wheels in the members N will contact with substantially the entire length of the upper reaches 5a. The hinging of the adjacent ends of the members L and N at 50 and 53, shown in Figure 13, permits the sets of wheels to accommodate themselves to the varying thicknesses of the pieces Y.

Referring to Figures 15 to 19, inclusive, it will be seen that the electrodes 69 and 71 are placed between adjacent belts 6 in the "Driven" section so that the electrodes will be positioned approximately midway between the adjacent lower reaches 6a of the endless belts 6, see Figure 18. The radio frequency current flowing between adjacent electrodes 69 and 71 will take a course which is parallel to the adhesive planes that have been applied to the edges 75 of the pieces Y. Parallel bonding of the adhesive planes takes place and there is a perfect bonding between the opposed edges 75 of the adjacent pieces Y. In this way a continuous sheet of veneer will issue from the "Driven" section of the machine and be composed of the pieces Y.

It is possible to apply different pressures to the skate wheel assemblies L and N and this is accomplished by admitting the desired amount of air from the tank 59, shown in Figure 8, to the three hose sections 46, 51 and 57, shown in Figure 12. The pressure of the compressed air in these sections can be read on the three air pressure gauges 46a, 51a and 57a, shown in Figure 1. By controlling the air pressure the operator can apply the desired amount of pressure to the upper reaches 3a and 5a of the endless belts 3 and 5 in the "Drive" and "Driven" sections for exerting a force on the pieces Y which will hold them in a flat plane without interfering with the normal movement of the pieces Y through the machine. We have found that it is necessary to mount the wheels in the members J and J1, K, L, M and N, in ball bearings so as to make them freely rotatable. We have further found that the sheaves A1, B1, H1, C2, C3, F2, F3, E2, E3, G2 and G3, must be relatively large in diameter so that the endless belts 1 to 6, inclusive, may move readily around the sheaves. If the force necessary to move the pieces Y through the driven section is greater than the pieces of veneer can withstand, because of the thickness of the veneer, the veneer would buckle and break. We have found that very thin pieces of veneer can be fed through the machine and edge bonded if the machine is made in accordance with the present disclosure.

If for any reason the pieces Y should become jammed in the driven section of the machine, the machine can be cleared by merely moving the clutch 35 into engagement with the sprocket 34 shown in Figure 8, so as to apply a rotative force to the shaft G1 and move the endless belts 6 for clearing the machine. At the end of any run, the remaining pieces Y in the "Driven" section will be moved out from this section by applying power to the shaft G1.

The sheaves E2, E3, G2 and G3 need not be keyed to their shafts E, E1, G and G1, respectively, and when not so keyed, each of the endless belts 5 and 6 will operate independently of the others and in strict accordance with their reaches 5a and 6a being in frictional contact with the veneer. The result is a smoother operating "Driven" section. In place of the clutch 35 a frictional drive, not shown, would be applied to the "Driven" section when it was desired to clear this section for any reason. The function of the non-rigid wheel assemblies J and J1 is to bring the pieces of veneer Y together quickly and save the operator this task. The "Speed-up" section of the machine accomplishes this task.

We claim:

1. In a device of the type described: a group of endless belts, each having one of its reaches adapted to move in a common flat plane with the other reaches and to be parallel with the other reaches and spaced apart; means for moving all of the reaches that lie in the same flat plane, in the same direction; a second group of endless belts, each having one of its reaches adapted to move in the same plane and to extend for a short distance between two adjacent reaches of the first group; a third group of endless belts, each having one of its reaches adapted to move in a second common plane that substantially parallels the first plane, and to cooperate with one of the reaches of the first group; the reaches of the third group that lie in the second plane, substantially paralleling each other and being spaced apart; a fourth group of endless belts, each having one of its reaches adapted to move in the second plane and to extend for a short distance between two adjacent reaches of the third group; the reaches of the fourth group that lie in the second plane co-operating with the reaches of the second group that lie in the first plane; a plurality of wheels contacting each of the reaches of the third group that lie in the second plane; a plurality of wheels contacting each of the reaches of the fourth group that lie in the second plane; an articulated frame for supporting the wheels that contact the reaches of the third and fourth groups; and means for exerting independent and yielding pressures at different points on the articulated frame for causing the reaches of the third and fourth groups that lie in the second plane, to move toward the first plane for gripping and guiding members as they are moved between the two planes.

2. In a device of the type described, a stationary frame; a plurality of pulleys rotatable about horizontal axes that are fixed relative to the frame; endless belts passed around certain of said pulleys to form two groups of belts, one constituting a drive section and the other a driven section; the lower reaches of the belts in the drive section lying in the same plane and paralleling one another and being spaced apart; the lower reaches of the belts in the driven section also lying in the same plane mentioned for the lower reaches of the belts in the drive section, and paralleling one another and being spaced apart; a portion of the lower reaches of the belts in the driven section extending between a portion of the lower reaches of the belts in the drive section; a floating frame carried by the stationary frame and being disposed below the lower belt reaches of the drive and driven sections; means for yieldingly urging the floating frame toward the plane defined by the lower reaches of the belts in the drive and driven sections; a plurality of pulleys supported by the floating frame and rotatable about horizontal axes; endless belts passed around certain of said last-named pulleys to form two groups of belts, one constituting a drive section whose upper reaches cooperate with the lower reaches of the belts in the first-mentioned drive section, and the other constituting a driven section whose upper reaches cooperate with the lower reaches of the belts in the first-mentioned driven section; an articulated, wheel-supporting frame having two portions hinged together and carried by the floating frame; sets of wheels carried by one portion of the articulated frame and bearing against the upper reaches of the belts in the drive section supported by the floating frame; other sets of wheels carried by the other portion of the articulated frame and bearing against the upper reaches of the belts in the driven section supported by the floating frame; and adjustable and independent yielding means supporting the articulated frame at the line of hinging between the two portions and at the outer ends of the portions; said adjustable and independent yielding means constituting the sole support between the articulated frame and the floating frame and exerting the desired upward pressure on the articulated frame.

3. In a device of the type described: a frame; a plurality of parallel and spaced-apart belts; a pair of cross members carried by the frame; two sets of depending insulators operatively connected to the cross members; each set of insulators being divided into two groups; a pair of spaced apart bus bars, one bus bar being carried by one group of insulators of one set and the other bus bar being carried by the other group of insulators of the same set; rods depending from the bus bars; electrodes carried by a depending rod from each bus bar; the electrodes being disposed between certain of the belts; a second pair of spaced-apart bus bars with one bus bar of this pair being carried by one group of insulators of the other set and the other bus bar of this last mentioned pair being carried by the other group of insulators of the last mentioned set; rods depending from the second pair of bus bars; a second set of electrodes carried by a depending rod from each of the bus bars of the last mentioned pair; the electrodes in the second set being disposed between the belts not already occupied by one of the first mentioned electrodes; the arrangement of electrodes being such that the electrodes first mentioned will alternate with the second set of electrodes; and means for applying a high frequency alternating current to the bus bars so that the first mentioned electrodes will be positive when the second set of electrodes will be negative and vice versa.

4. In a device of the type described: a power driven group of endless belts and an idling group of endless belts; the belts in the power group partially lapping the belts of the idling group; both groups of belts having one reach of each belt adapted to move in a common fixed flat plane in the same direction and to be parallel with the other reaches of the same group and spaced apart; two additional groups of belts lapping each other with one group opposing the power driven group and the other group opposing the idling group; the second-mentioned two groups of belts having one reach of each belt adapted to move in a second common articulated plane that substantially parallels the first-mentioned plane; the second common articulated plane comprising two sections hinged together where the second groups of belts lap each other; and adjustable pneumatic pressure means including wheels that contact with the belt reaches lying in the second plane; said adjustable pneumatic pressure means yieldingly urging the individual reaches in the second plane, toward the reaches in the first plane; whereby the reaches in the two planes are adapted to grip members therebetween and to automatically compensate for slight irregularities in the thicknesses of the members as certain of the member-engaging reaches in the first plane, move the members between the planes.

5. In a device of the type described, a stationary frame; a plurality of pulleys rotatable about horizontal axes that are fixed relative to the frame; endless belts passed around certain of said pulleys to form two groups of belts, one constituting a drive section and the other a driven section; the lower reaches of the belts in the drive section lying in the same plane and paralleling one another and being spaced apart; the lower reaches of the belts in the driven section also lying in the same plane mentioned for the lower reaches of the belts in the drive section, and paralleling one another and being spaced apart; a portion of the lower reaches of the belts in the driven section extending between a portion of the lower reaches of the belts in the drive section; a floating frame carried by the stationary frame and being disposed below the lower belt reaches of the drive and driven sections; a plurality of pulleys supported by the floating flame and rotatable about horizontal axes; endless belts passed around certain of said last-named pulleys to form two groups of belts, one constituting a drive section whose upper reaches cooperate with the lower reaches of the belts in the first-mentioned drive section, and the other constituting a driven section whose upper reaches cooperate with the lower reaches of the belts in the first-mentioned driven section; an articulated, wheel-supporting frame having two portions hinged together and carried by the floating frame; sets of wheels carried by one portion of the articulated frame and bearing against the upper reaches of the belts in the drive section supported by the floating frame; other sets of wheels carried by the other portion of the articulated frame and bearing against the upper reaches of the belts in the driven section supported by the floating frame; and adjustable and independent yielding means supporting the articulated frame and exerting the desired upward pressure on the articulated frame.

6. In a continuously-operated radio frequency adhesive setter for the edge-bonding of a plurality of flat members into a unitary flat structure: drive means for gripping the members on their upper and lower surfaces at transversely spaced points for continuously advancing the members in processional relation in a flat plane and following one behind the other; retarding means for gripping the members at transversely spaced points and intermediate the first gripping points on both surfaces for bringing the continuously-moving members into positions wherein confronting edges of adjacent members will be brought into contact with each other and held together, without stopping the general forward advancement of the members in the procession; and means for directing radio frequency lines of force into the adhesive disposed on said confronting edges at points between those made by the second mentioned gripping means for setting the adhesive and edge-bonding the members together, due to the R. F. lines of force travelling into adhesive between points of gripping, while the members continue to advance in contacting relation without interruption.

7. In a device of the type described: a feed group of endless belts, each having one of its reaches adapted to move in a common flat plane with the other reaches and to be parallel with the other reaches and spaced apart; means for moving all of the reaches that lie in the same flat plane in the same direction; a driven group of endless belts, each having one of its reaches adapted to move in the same plane and to extend for a short distance between two adjacent reaches of the first group; radio frequency elongated electrodes placed between the reaches of the driven group of endless belts; a second feed group of endless belts, each having one of its reaches adapted to move in a second common plane that substantially parallels the first feed group plane and cooperates therewith; the reaches of the second feed group that lie in the second plane, substantially paralleling each other and being spaced apart; a second driven group of endless belts, each having one of its reaches adapted to move in the second plane and to extend for a short distance between two adjacent reaches of the second-mentioned feed group; the reaches of the second driven group that lie in the second plane cooperating with the reaches of the first driven group that lie in the first plane; a plurality of wheels contacting each of the reaches of the second feed group that lie in the second plane; a plurality of wheels contacting each of the reaches of the second driven group that lie in the second plane; an articulated frame for supporting the wheels that contact the reaches of the second feed and second driven groups; means for exerting independent and yielding pressures at different points on the articulated frame for causing the reaches of the second feed and second driven groups that lie in the second plane to move toward the first plane for gripping and guiding members as they are moved between the two planes; to thereby move confronting edges of the members into abutting relation as the members move from the feed group of endless belts into the driven group of endless belts; and means for applying radio frequency current to the electrodes for setting the adhesive and bonding the members together as they pass through the driven group of endless belts.

8. In a device of the type described, a stationary frame; a plurality of pulleys rotatable about horizontal axes that are fixed relative to the frame; endless belts passed around certain of said pulleys to form two groups of belts, one constituting a drive section and the other a driven section; the lower reaches of the belts in the drive section lying in the same plane and paralleling one another and being spaced apart; the lower reaches of the belts in the driven section also lying in the same plane mentioned for the lower reaches of the belts in the drive section, and paralleling one another and being spaced apart; a portion of the lower reaches of the belts in the drive section extending between a portion of the lower reaches of the belts in the driven section; radio frequency elongated electrodes lying between the lower reaches of the driven section; a floating frame carried by the stationary frame and being disposed below the lower belt reaches of the drive and driven sections; a plurality of pulleys supported by the floating frame and rotatable about horizontal axes; endless belts passed around certain of said last-named pulleys to form two groups of belts, one constituting a drive section whose upper reaches cooperate with the lower reaches of the belts in the first-mentioned drive section, and the other constituting a driven section whose upper reaches cooperate with the lower reaches of the belts in the first-mentioned driven section; an articulated wheel-supporting frame having two portions hinged together and carried by the floating frame; sets of wheels carried by one portion of the articulated frame and bearing against the upper reaches of the belts in the drive section supported by the floating frame; other sets of wheels carried by the other portion of the articulated frame and bearing against the upper reaches of the belts in the driven section supported by the floating frame; adjustable and independent yielding means supported by the floating frame and exerting the desired upward pressure on the articulated frame; said drive and driven sections being adapted to receive members therebetween where at least one confronting edge of each member has a layer of adhesive; to thereby bring confronting edges of the members into contact with each other when the members reach the driven section; and means for applying radio frequency current to the electrodes for setting the adhesive and bonding the members together as they pass through the driven section.

9. In a device of the type described: a fixed frame; a pair of spaced-apart and parallely arranged shafts carried by the frame; a plurality of pulleys mounted on each shaft with the pulleys on one shaft being aligned with the pulleys on the other shaft; endless belts carried by the aligned pulleys and constituting a feed section; a second pair of spaced apart and parallely arranged shafts carried by the frame; a plurality of pulleys mounted on each of the second pair of shafts with the pulleys on these shafts being in alignment with each other; a second set of endless belts constituting a driven section and being carried by the aligned pulleys on the second pair of shafts with portions of the belts lapping portions of the belts in the feed section; the partial lapping of the two sets of belts being such that the belts on the feed section will alternate with the belts on the driven section and the two sets of belts will have their reaches lying in a single flat plane; means for continuously moving the first set of belts so that the pieces of material having their faces contacting therewith will be moved thereby; radio frequency elongated electrodes lying between the reaches in the driven section, that lie in the flat plane; a spring-pressed frame yieldingly urged toward the fixed frame; a third pair of spaced apart and parallely arranged shafts carried by the spring-pressed frame and disposed opposite the feed section; a plurality of pulleys mounted on each of the third pair of shafts with the pulleys on one shaft being aligned with the pulleys on the other shaft; a third set of endless belts carried by the aligned pulleys on the third pair of shafts and constituting a second feed section that cooperates with the first feed section; a fourth pair of spaced apart and parallely arranged shafts carried by the spring-pressed frame and disposed opposite the driven section; a plurality of pulleys mounted on each of the fourth-mentioned pair of shafts with the pulleys on the other shaft; a fourth set of endless belts carried by the aligned pulleys on the fourth pair of shafts and constituting a second driven section that cooperates with the first driven section; the belts of the second driven section having portions lapping belt portions of the second drive section; the belts in the second drive and driven sections having reaches lying in a second plane that substantially parallels the first-mentioned flat plane and these reaches contact with the opposite faces of the pieces of material; rows of rollers holding the reaches in the second flat plane in contact with the pieces of material; adjustable pneumatic means for yieldingly urging the rows of rollers toward the pieces of material at a desired yielding pressure; each piece of material having at least one edge provided with adhesive; to thereby bring confronting edges of the members into contact with each other when the members reach the driven section; and means for applying radio frequency current to the electrodes for setting the adhesive and bonding the members together as they pass through the driven section.

10. In an apparatus for effecting edge to edge radio frequency bonding of members having adhesive on at least one of their confronting edges of adjacent members: the combination of a power-driven feed conveyor including two sets of endless belts with the reaches of one set forming a flat plane that parallels a second flat plane formed by the reaches in the second set; a driven conveyor including two additional sets of endless belts with the reaches of one of the second sets lying in the first-mentioned flat plane and portions of the belts themselves lapping adjacent portions of the feed section belts that also lie in the first plane; the reaches of the other of the second sets of driven belts lying in the second flat plane and having portions of the belts lapping portions of the feed section whose reaches lie in the second flat plane; the two feed section belts that have their reaches contacting the members, placing these reaches under tension due to the pulling force exerted by the reaches on the members for moving them, and the two driven belt sections that have their reaches contacting the members, placing these reaches under compression due to the pushing force exerted by the members on the reaches for moving them; whereby the confronting edges of adjacent members are held together under a constant predetermined pressure while the members travel through the driven section; and means including electrodes lying between reaches of the endless belts of the driven conveyor for applying radio frequency current on the adhesive as the members move along the driven section for bonding the members together.

11. The combination as set forth in claim 10; and in which the means for applying radio frequency current includes elongated electrodes lying between the reaches of the driven section that in turn lie in the first flat plane.

References Cited in the file of this patent

UNITED STATES PATENTS

| | | |
|---|---|---|
| 1,199,818 | Peck | Oct. 3, 1916 |
| 1,702,185 | Weber | Feb. 12, 1929 |
| 2,137,506 | Osgood | Nov. 22, 1938 |
| 2,212,522 | Hart, et al. | Aug. 27, 1940 |
| 2,290,762 | Miller | July 21, 1942 |
| 2,303,087 | Neller | Nov. 24, 1942 |
| 2,398,353 | Bolling | Apr. 16, 1946 |
| 2,434,573 | Mann et al. | Jan. 13, 1948 |
| 2,446,623 | Welch | Aug. 10, 1948 |
| 2,453,185 | Bilhuber | Nov. 9, 1948 |
| 2,488,759 | Bolling | Nov. 22, 1949 |
| 2,512,311 | Davis | June 20, 1950 |
| 2,550,006 | Dreyfus | Apr. 24, 1951 |
| 2,551,851 | Reid | May 8, 1951 |
| 2,571,604 | Payzant | Oct. 16, 1951 |
| 2,575,251 | Arnold | Nov. 13, 1951 |
| 2,599,930 | Mann | June 10, 1952 |
| 2,625,969 | Mann | Jan. 20, 1953 |
| 2,633,166 | Gillespie et al. | Mar. 31, 1953 |